United States Patent
Kyo (10) Patent No.: US 9,899,666 B2
(45) Date of Patent: *Feb. 20, 2018

(54) LIQUID LEAD-ACID BATTERY AND IDLING STOP VEHICLE USING LIQUID LEAD-ACID BATTERY

(71) Applicant: GS Yuasa International Ltd., Kyoto-shi, Kyoto (JP)

(72) Inventor: Masaaki Kyo, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/145,305

(22) Filed: May 3, 2016

(65) Prior Publication Data

US 2016/0248080 A1 Aug. 25, 2016

Related U.S. Application Data

(63) Continuation of application No. 14/332,859, filed on Jul. 16, 2014, now Pat. No. 9,362,596.

(30) Foreign Application Priority Data

Jul. 19, 2013 (JP) ................... 2013-150607
Apr. 22, 2014 (JP) ................... 2014-088285

(51) Int. Cl.
*H01M 4/14* (2006.01)
*H01M 4/56* (2006.01)
(Continued)

(52) U.S. Cl.
CPC ............. *H01M 4/14* (2013.01); *H01M 2/024* (2013.01); *H01M 2/12* (2013.01); *H01M 4/38* (2013.01);
(Continued)

(58) Field of Classification Search
CPC ........ H01M 4/14; H01M 10/14; H01M 10/12; H01M 2004/021; H01M 2220/20; Y02E 60/126

See application file for complete search history.

(56) References Cited

U.S. PATENT DOCUMENTS

| 4,324,848 A | 4/1982 | Will |
| 6,063,525 A | 5/2000 | LaFollette |

(Continued)

FOREIGN PATENT DOCUMENTS

| JP | 5-242882 | 9/1993 |
| JP | 6-140030 | 5/1994 |

(Continued)

OTHER PUBLICATIONS

Extended European Search Report dated Sep. 30, 2014 issued in European patent application No. 14175568.6.

*Primary Examiner* — Muhammad S Siddiquee
(74) *Attorney, Agent, or Firm* — Rankin, Hill & Clark LLP (57) ABSTRACT

A volume Ve of an electrode group thereof is calculated by $Ve=(Sp+Sn) \times D/2$, where Sp represents an electrode plate area of a positive electrode plate, Sn represents an electrode plate area of a negative electrode plate, D represents the internal dimension of a container in the direction in which the electrode plates of the electrode group are laminated. A ratio $(Vp+Vn)/Ve$ is 0.27 to 0.32, where $Vp+Vn$ is the sum volume of the total pore volume Vp of a positive active material and the total pore volume Vn of the negative active material contained in the electrode group, and Ve is the volume of the electrode group. A ratio $Vp/Ve$ is 0.13 to 0.15, where Vp is the total pore volume of the positive active material and Ve is the volume of the electrode group.

14 Claims, 6 Drawing Sheets

(51) Int. Cl.
*H01M 10/14* (2006.01)
*H01M 10/12* (2006.01)
*H01M 2/02* (2006.01)
*H01M 2/12* (2006.01)
*H01M 4/38* (2006.01)
*H01M 4/66* (2006.01)
*H01M 4/72* (2006.01)
*H01M 10/08* (2006.01)
*H01M 4/02* (2006.01)

(52) U.S. Cl.
CPC .............. *H01M 4/56* (2013.01); *H01M 4/662* (2013.01); *H01M 4/72* (2013.01); *H01M 10/08* (2013.01); *H01M 10/12* (2013.01); *H01M 10/14* (2013.01); *H01M 2004/021* (2013.01); *H01M 2004/027* (2013.01); *H01M 2004/028* (2013.01); *H01M 2220/20* (2013.01); *Y02E 60/126* (2013.01)

(56) References Cited

U.S. PATENT DOCUMENTS

| | | | |
|---|---|---|---|
| 7,514,179 | B2 | 4/2009 | Yoshimine et al. |
| 2006/0154148 | A1* | 7/2006 | Yoshimine ............... C22C 11/02 429/245 |
| 2006/0166084 | A1* | 7/2006 | Chenebault ............ H01M 4/661 429/101 |
| 2009/0014220 | A1* | 1/2009 | Ishizeki ............... F02N 11/0814 180/54.1 |
| 2012/0081838 | A1* | 4/2012 | Costantino ............... H01B 1/04 361/502 |
| 2012/0251875 | A1 | 10/2012 | Yeh |
| 2013/0004841 | A1* | 1/2013 | Thompkins ............ H01G 11/50 429/204 |
| 2013/0089795 | A1* | 4/2013 | Chase .................. H01M 4/8605 429/405 |
| 2015/0311531 | A1* | 10/2015 | Tanjo .................... H01M 4/502 429/163 |

FOREIGN PATENT DOCUMENTS

| | | |
|---|---|---|
| JP | 6-314572 | 11/1994 |
| JP | 7-211343 | 8/1995 |
| JP | 9-199115 | 7/1997 |
| JP | 10-69900 | 3/1998 |
| JP | 10-270028 | 10/1998 |
| JP | 10-302783 | 11/1998 |
| JP | 11-162456 | 6/1999 |
| JP | 2000-30696 | 1/2000 |
| JP | 2000-133253 | 5/2000 |
| JP | 2001-23682 | 1/2001 |
| JP | 2001-35485 | 2/2001 |
| JP | 2001-57228 | 2/2001 |
| JP | 2001-250589 | 9/2001 |
| JP | 2003-86178 | 3/2003 |
| JP | 2004-47301 | 2/2004 |
| JP | 2004-55323 | 2/2004 |
| JP | 2004-79198 | 3/2004 |
| JP | 2005-100794 | 4/2005 |
| JP | 2009-158286 | 7/2009 |
| JP | 2010-170939 | 8/2010 |
| JP | 2010-225408 | 10/2010 |
| JP | 2012-123964 | 6/2012 |
| JP | 2013-041757 | 2/2013 |
| JP | 2013-89478 | 5/2013 |
| JP | 2013-93101 | 5/2013 |

* cited by examiner

FIG. 1

POSITIONAL ELECTRODE PLATE OR NEGATIVE ELECTRODE PLATE

LIQUID LEAD-ACID BATTERY AND IDLING STOP VEHICLE USING LIQUID LEAD-ACID BATTERY

CROSS-REFERENCE TO RELATED APPLICATIONS

This application is based on Japanese Patent Applications No. 2013-150607 filed on Jul. 19, 2013, and No. 2014-088285 filed on Apr. 22, 2014, the entire contents of which are hereby incorporated by reference.

FIELD

The present invention relates to a liquid lead-acid battery and an idling stop vehicle using the liquid lead-acid battery.

BACKGROUND

In recent years, an automobile equipped with the idling stop function has been widely diffused for the purpose of increasing gas mileage of the automobile. A lead-acid battery mounted on an idling stop vehicle is used in lower state of charge than a conventional engine-start lead-acid battery, and overcharge that invites generation of a large amount of gas is not performed. Therefore, the electrolyte solution is not fully agitated. As a result, the lead-acid battery for an idling stop vehicle tends to suffer the followings: the stratification of the electrolyte solution having occurred during charge-discharge cycles is not solved; irregularity in charge-discharge reactions in the longitudinal direction of the electrode plates becomes more pronounced; whereby a particular portion intensively deteriorates to reach the life of the battery (JP-A-2010-170939).

One scheme for suppressing stratification of the lead-acid battery for an idling stop vehicle is to increase the pore volume of the active material of the electrode plates. Thus, since the amount of electrolyte solution contained in the active material can be increased, the proportion of the charge-discharge reactions occurring in the electrode plates is increased. As a result, the progress of the stratification can be delayed. However, when the pore volume is simply increased, the density of the active material is reduced. This accelerates softening of the active material at the positive electrode plate, and a reduction in conductivity is invited at the negative electrode plate because of weakening in the coupling force in the active material. Thus, reactions occur irregularly, whereby stratification is accelerated.

SUMMARY OF THE INVENTION

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been made to provide a high-capacity and long-life liquid lead-acid battery by suppressing stratification of the electrolyte solution.

As a result of a thorough study, the inventor of the present invention has found that stratification of the electrolyte solution can be suppressed by causing the pore structure (pore volume, pore distribution) of the positive and negative active materials to satisfy specific conditions.

That is, a liquid lead-acid battery according to a first aspect of the present invention is a liquid lead-acid battery including: an electrode group containing a lamination of a positive electrode plate in which a positive active material is carried by a positive current collector and a negative electrode plate in which a negative active material is carried by a negative current collector; an electrolyte solution which has flowability and in which the electrode group is immersed; and a container storing the electrode group and the electrolyte, solution. When a volume Ve of the electrode group is calculated by $Ve=(Sp+Sn) \times D/2$ where Sp represents an electrode plate area of the positive electrode plate, Sn represents an electrode plate area of the negative electrode plate, and D represents internal dimension of the container in a direction in which the electrode plates of the electrode group are laminated, a ratio $(Vp+Vn)/Ve$ is 0.27 to 0.32, where $Vp+Vn$ is a sum volume of a total pore volume Vp of the positive active material and a total pore volume Vn in of the negative active material contained in the electrode group, and Ve is a volume of the electrode group, and a ratio $Vp/Ve$ is 0.13 to 0.15, where Vp is the total pore volume of the positive active material and Ve is the volume of the electrode group.

BRIEF DESCRIPTION OF THE DRAWINGS

The foregoing and other features of the present invention will become apparent from the following description and drawings of an illustrative embodiment of the invention in which.

DETAILED DESCRIPTION

A liquid lead-acid battery according to a first aspect of the present invention is a liquid lead-acid battery including: an electrode group containing a lamination of a positive electrode plate in which a positive active material is carried by a positive current collector and a negative electrode plate in which a negative active material is carried by a negative current collector; an electrolyte solution which has flowability and in which the electrode group is immersed; and a container storing the electrode group and the electrolyte solution. When a volume Ve of the electrode group is calculated by $Ve=(Sp+Sn) \times D/2$ where Sp represents an electrode plate area of the positive electrode plate, Sn represents an electrode plate area of the negative electrode plate, and D represents internal dimension of the container in a direction in which the electrode plates of the electrode group are laminated, a ratio $(Vp+Vn)/Ve$ is 0.27 to 0.32, where Vp+Vn is a sum volume of a total pore volume Vp of the positive active material and a total pore volume Vn of the negative active material contained in the electrode group, and Ve is a volume of the electrode group, and a ratio Vp/Ve is 0.13 to 0.15, where Vp is the total pore volume of the positive active material and Ve is the volume of the electrode group.

Note that, in the first aspect of the present invention, Vp or Vn (the total pore volume of the positive active material or the negative active material) is the sum of volume of all the pores formed in the active material. This can be calculated by multiplying the total pore volume (per unit mass) by the total mass of the active material contained in the electrode group.

Figure 1:
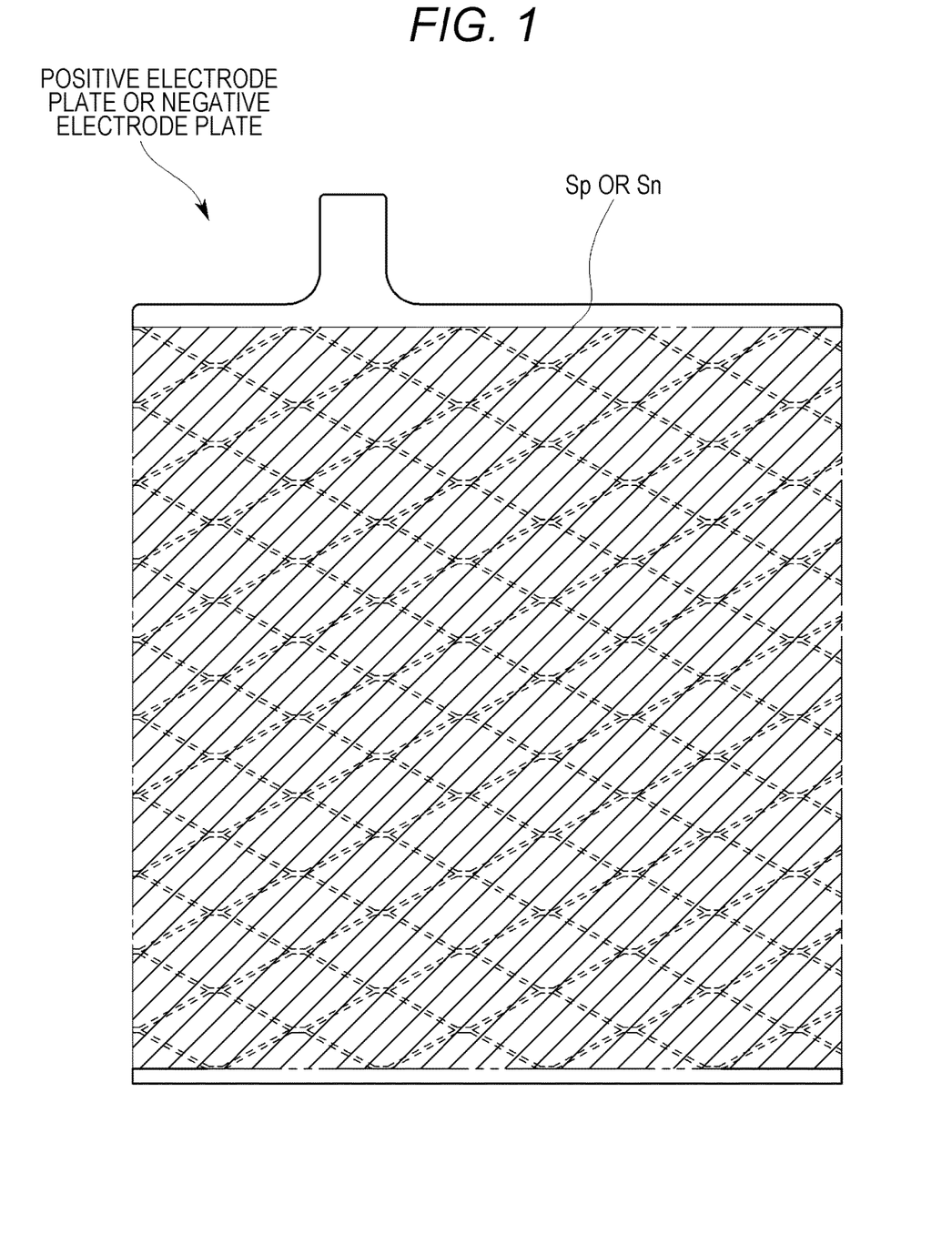
FIG. 1 shows Sp or Sn.

Sp or Sn (the electrode plate area of the positive electrode plate or the negative electrode plate) represents the area of one surface of the active material packed portion of the current collector used in each electrode plate. In the case where an expanded grid is used, as shown in FIG. 1, the area of the top frame skeleton and that of the bottom frame skeleton are not included. In the case where a casted grid is used, the area of the surrounding main frame skeleton, i.e., a so-called frame skeleton, is not included. That is, Sp and Sn are each the area over which the active material is applied. Here, the area of the active material applied to the frame skeleton is not counted.

Figure 2A:
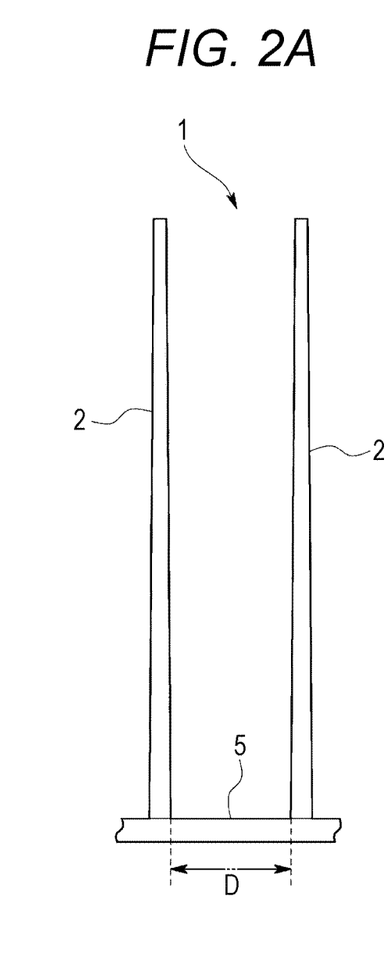
FIGS. 2A to 2D are each a schematic vertical cross-sectional view showing a container.
Figure 2B:
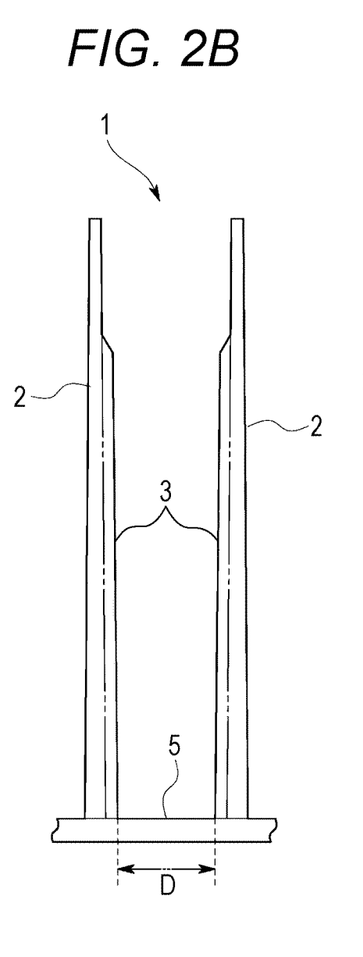
Figure 2C:
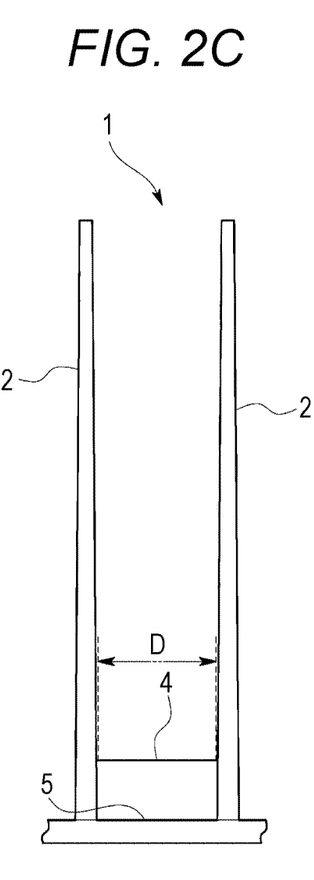
Figure 2D:
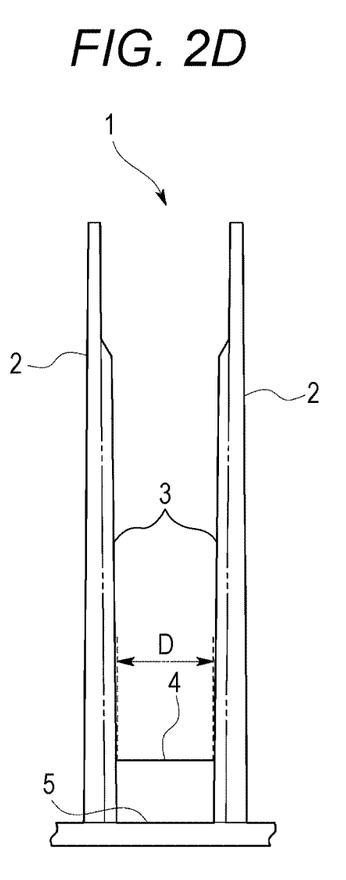

As shown in FIGS. 2A to 2D, D (the internal dimension of the container in the direction in which the electrode plates of the electrode group are laminated) represents the internal dimension of the container 1 at a part where the distance between partitions 2 is the smallest (FIG. 2A). In the case where an element rest 4 is provided at the bottom face 5 of the container 1, D represents the internal dimension over the element rest 4 (FIGS. 2C and 2D). Also, in the case where a spacer is used, D represents the value obtained by subtracting the thickness of the spacer from the internal dimension of the container 1. Further, in the case where ribs 3 are provided at the partitions 2 of the container 1, D represents the distance between the ribs 3 (FIGS. 2B and 2D).

Note that, the numerical values specifying the present invention are all measured after formation. The pore volume and the pore distribution are measured by mercury intrusion porosimetry.

In the first aspect of the present invention, the positive active material preferably contains antimony (Sb) by 0.04 mass % to 0.25 mass %.

In the positive active material, preferably, the proportion of the pore size (which means the diameter, and the same holds true for the following) of 0.1 μm to 1.0 μm to the total pore volume is 45% or greater, and the proportion of the pore volume of a pore size of 1 μm or greater to the total pore volume is 25% or smaller.

Meanwhile, in the negative active material, preferably, the total pore volume (per unit mass) is 0.12 cm$^3$/g to 0.15 cm$^3$/g, and the proportion of the pore volume of a pore size of 0.5 μm to 5.0 μm to the total pore volume is 50% or greater.

As each of the current collectors, for example an expanded current collector, a punched current collector or the like is used.

The liquid lead-acid battery of the present invention is suitably used for an idling stop vehicle.

An idling stop vehicle including the liquid lead-acid battery according to the first aspect of the present invention is also one aspect of the present invention.

According to the aspects of the present invention described above, by the pore structure (pore volume, pore distribution) of the positive and negative active materials satisfying the particular conditions, stratification of the electrolyte solution is suppressed, whereby a liquid lead-acid battery having excellent life performance as well as high discharge capacity can be obtained.

In the following, an embodiment of the present invention will be described in detail.

A liquid (vented type) lead-acid battery according to the embodiment of the present invention includes: an electrode group in which pasted positive electrode plates and negative electrode plates are laminated, each of the positive and negative electrode plates having positive or negative active material carried on a current collector; an electrolyte solution which has flowability and in which the electrode group is immersed; and a container containing the electrode group and the electrolyte solution. Note that, in the present embodiment, grid-shaped current collectors are employed. The grid-shaped current collectors are referred to as grids hereinafter.

Each of the negative electrode plates is structured by a grid that is made of Pb—Sb alloys, Pb—Ca alloys or the like, and that carries a negative active material whose main component is lead. Each of the positive electrode plates is structured by a grid that is made of Pb—Sb alloys, Pb—Ca alloys or the like, and that carries a positive active material whose main component is lead dioxide. The electrode group is Made up of those negative electrode plates and positive electrode plates being alternately laminated. Here, normally, a porous separator is disposed between the electrode plates in order to prevent short-circuiting. The electrode group is stored in the container as being immersed in an electrolyte solution whose main component is sulfuric acid.

In connection with the liquid lead-acid battery according to the embodiment of the present invention, a volume Ve of the electrode group is calculated by the following Equation (1). A ratio (Vp+Vn)/Ve is 0.27 to 0.32, preferably 0.29 to 0.31, where Vp+Vn is a sum volume of a total pore volume Vp of the positive active material and a total pore volume Vn of the negative active material contained in the electrode group and Ve is a volume of the electrode group.

$$Ve=(Sp+Sn)\times D/2 \quad \text{Equation (1)}$$

where Sp represents the electrode plate area of the positive electrode plates, Sn represents the electrode plate area of the negative electrode plate, and D represents the internal dimension of the container in the electrode plate laminating direction of the electrode group.

When (Vp+Vn)/Ve is less than 0.27, the stratification suppression effect is insufficient and the life becomes short. On the other hand, when (Vp+Vn)/Ve exceeds 0.32, the stratification suppression effect is saturated. Further, when (Vp+Vn)/Ve exceeds 0.32, the interval between the electrode plates becomes narrow, whereby dendrite short circuit becomes prone to occur.

In the embodiment of the present invention, a ratio Vp/Ve is 0.13 to 0.15, where Vp is the total pore volume of the positive active material and Ve is the volume of the electrode group. When Vp/Ve less than 0.13, a sufficient capacity cannot be obtained. On the other hand, when Vp/Ve exceeds 0.15, the stratification suppression effect is reduced, and the life becomes short. In contrast thereto, when Vp/Ve falls within the range of 0.13 to 0.15, the stratification is suppressed, whereby a lead-acid battery having well-balanced life performance and discharge capacity can be obtained.

As to the pores formed at the positive active material and the negative active material, smaller pore size is preferable in view of the stratification suppressing effect, because sulfuric acid generated during charging is less prone to be released. On the other hand, with excessively small pore size, the pores are closed by lead sulfate during discharging, whereby diffusion of the electrolyte solution is blocked. Accordingly, the utilization factor of the active material becomes insufficient, and a great capacity cannot be obtained. Therefore, for the purpose of enhancing the stratification suppressing effect and the capacity, it is important that a pore structure having proper pore volume and pore distribution is formed at the negative active material and the positive active material. In particular, with the liquid lead-acid battery according to the embodiment of the present invention, it is preferable that the relationship Vn>Vp is established. Accordingly, the influence of the pore structure (pore volume and pore distribution) of the negative active material on the stratification suppressing effect is great.

Therefore, the negative active material preferably has the pore structure in which the total pore volume (per unit mass) is 0.12 cm$^3$/g to 0.15 cm$^3$/g and the proportion of the pore volume of a pore size of 0.5 μm to 5.0 μm to the total pore volume is 50% or greater.

The positive active material preferably has the pore structure in which the proportion of the pore volume of a pore size of 0.1 μm to 1.0 μm to the total pore volume is 45% or greater, and the proportion of the pore volume of a pore size of 1 μm or greater to the total pore volume is 25% or The positive active material preferably contains antimony by 0.04 mass % to 0.25 mass %, and more preferably by 0.08 mass % to 0.17 mass %. When the antimony content is 0.04 mass % or greater, stratification can be preferably suppressed even at the terminal stage of the battery life. When the antimony content exceeds 0.25 mass %, formability is reduced and a sufficient capacity cannot be easily obtained. In contrast thereto, when the antimony content of the positive active material is 0.04 mass % to 0.25 mass %, stratification is suppressed in an excellent manner even at the terminal stage of the battery life. Thus, long life and high capacity can both be achieved.

In order for the positive active material to contain antimony, for example, antimony compounds such as antimony trioxide, antimony tetroxide, antimony pentoxide, antimony sulfate or the like should be added when the positive active material paste is prepared.

The grid on which the positive active material or the negative active material is carried is not particularly limited. For example, an expanded grid, a punched grid or the like may be employed. Among others, with a punched grid that is manufactured by subjecting a rolled sheet to punching, the life performance at low temperatures can be improved.

The liquid lead-acid battery of the embodiment of the present invention described above is suitable for use with an idling stop vehicle. Further, an idling stop vehicle using the liquid lead-acid battery of the embodiment of the present invention is also one embodiment of the present invention.

Example

In the following, a further detailed description will be given of the present invention showing an example thereof. However, the present invention is not limited to the example.

Figure 3:
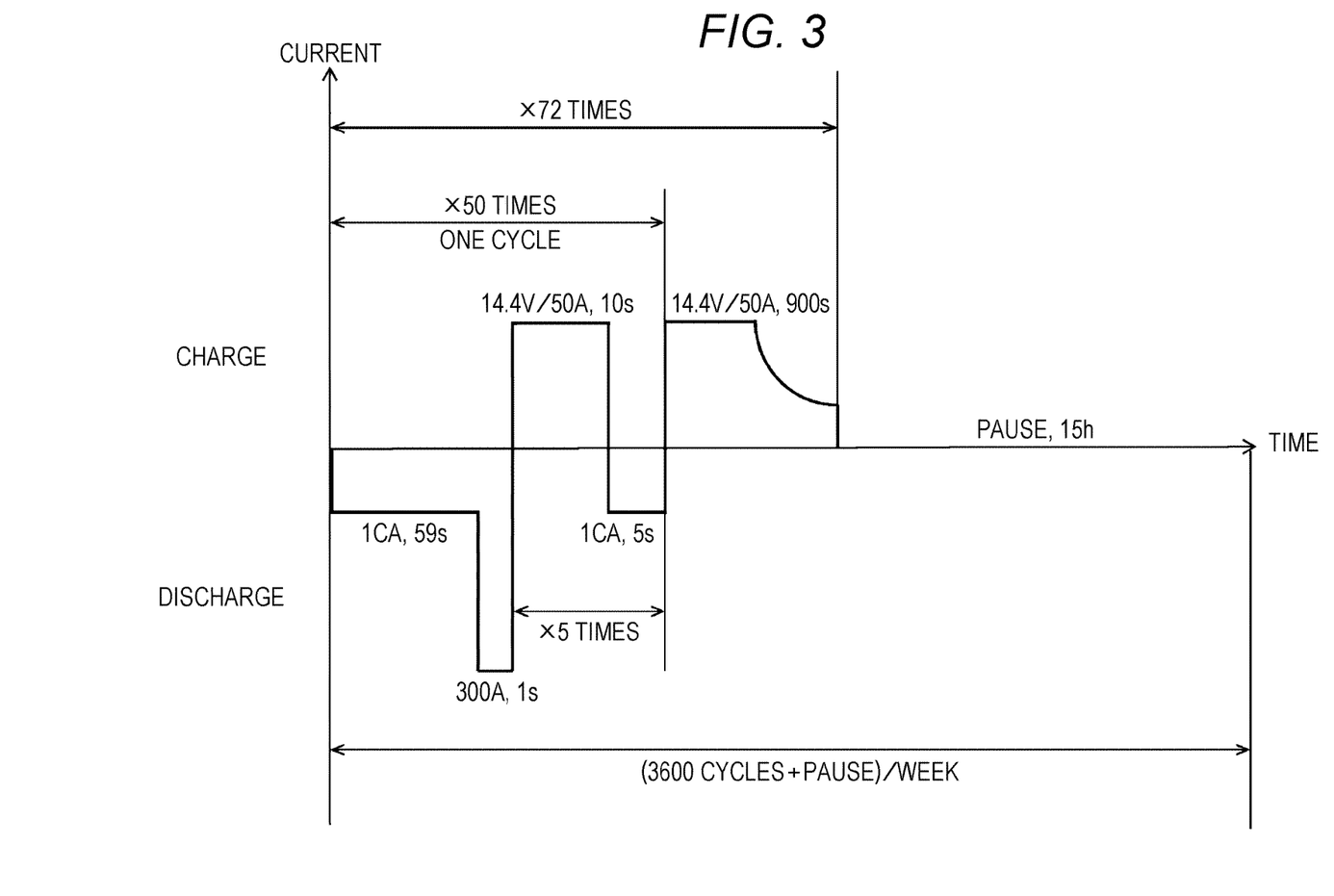
FIG. 3 shows a test pattern of an idling stop life test.

Liquid lead-acid batteries of type B20 in JIS format with varied pore volume and pore distribution of the active material were prepared as the batteries subjected to test, and an idling stop life test and a 5-hour rate capacity test were carried out. The idling stop life test was carried out in the test pattern in the manner shown in the following Table 1 and FIG. 3, and the 5-hour rate capacity test was carried out adhering to JIS D 5301-2006.

TABLE 1

| | | Test condition | | | |
|---|---|---|---|---|---|
| Step | Content | Current, Voltage | Ending condition | Temperature | Note |
| 1 | Specific gravity measurement | — | | Room temperature | |
| 2 | CC discharge | 1 CA | 59 s | 40° C. | |
| 3 | CC discharge | 300 A | 1 s | 40° C. | |
| 4 | CV charge | 14.4 V/ 50 A | 10 s | 40° C. | |
| 5 | CC discharge | 1 CA | 5 s | 40° C. | |
| 6 | Repeat steps 4 and 5 | Practically 5 times | | 40° C. | 135 seconds up to this point (one cycle) |
| 7 | Repeat steps 2 to 6 | Practically 50 times | | 40° C. | |
| 8 | CV charge | 14.4 V/ 50 A | 900 s | 40° C. | About 2 hours up to this point (50 cycles) |
| 9 | Repeat steps 2 to 8 | Practically 72 times | | 40° C. | |
| 10 | Pause | 15 h | | 40° C. | One week up to this point (3600 cycles) |
| 11 | Return to step 1 | — | | 40° C. | |

Then, after a lapse of a prescribed cycle after the idling stop life test, the specific gravity at each of the upper and lower parts in the electrolyte solution was measured. The difference in specific gravity between the upper part and the lower part was calculated. Note that, the difference in specific gravity between the upper and lower parts of the electrolyte solution was measured by sampling an upper ⅓ part of the electrolyte solution and a lower ⅓ part of the electrolyte solution in the height direction of the electrode plate. The scheme of sampling the electrolyte solution was as follows. With a liquid lead-acid battery, a tube was inserted to each part and sampled. With a valve regulated lead-acid battery, the battery was disassembled, and the electrolyte solution contained in the separator was sampled.

The antimony content in the positive active material and the pore volume and the pore distribution of the positive and negative active materials in each battery subjected to test were measured by the following scheme. That is after formation, each battery was discharged at 5-hour rate, and charged by the amount corresponding to 150% discharged electricity amount. Thereafter, the battery subjected to the test was disassembled. The antimony content in the positive active material was measured by ICP optical emission spectrometry. The pore volume and the pore distribution in the positive and negative active materials were measured by the mercury intrusion porosimetry.

Figure 4A:
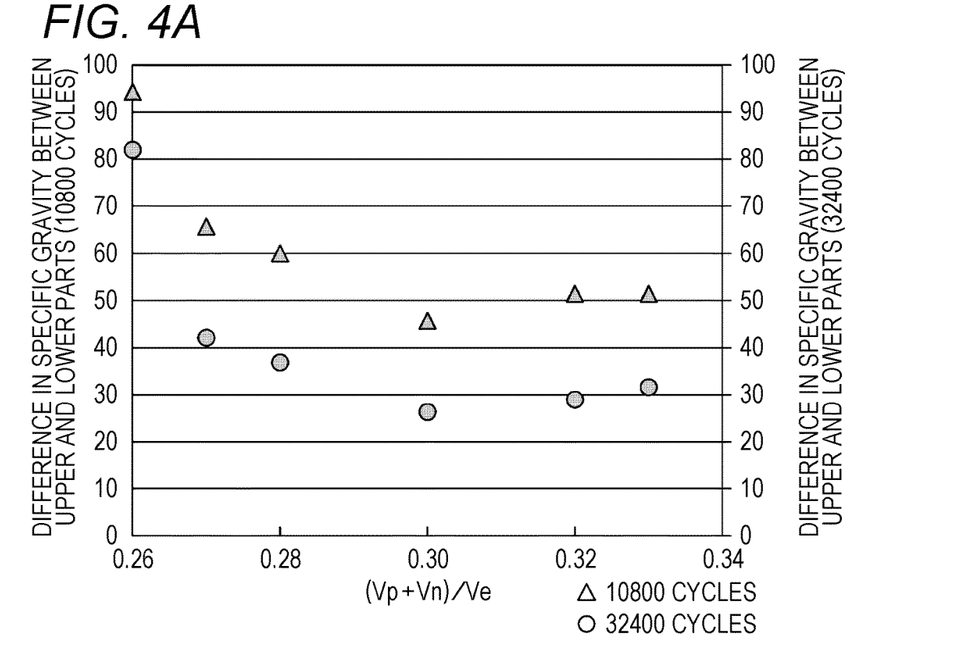
FIGS. 4A and 4B show the relationship among $(Vp+Vn)/Ve$, differences in specific gravity between the upper and lower parts of an electrolyte solution, life performance, and 5-hour rate capacity.
Figure 4B:
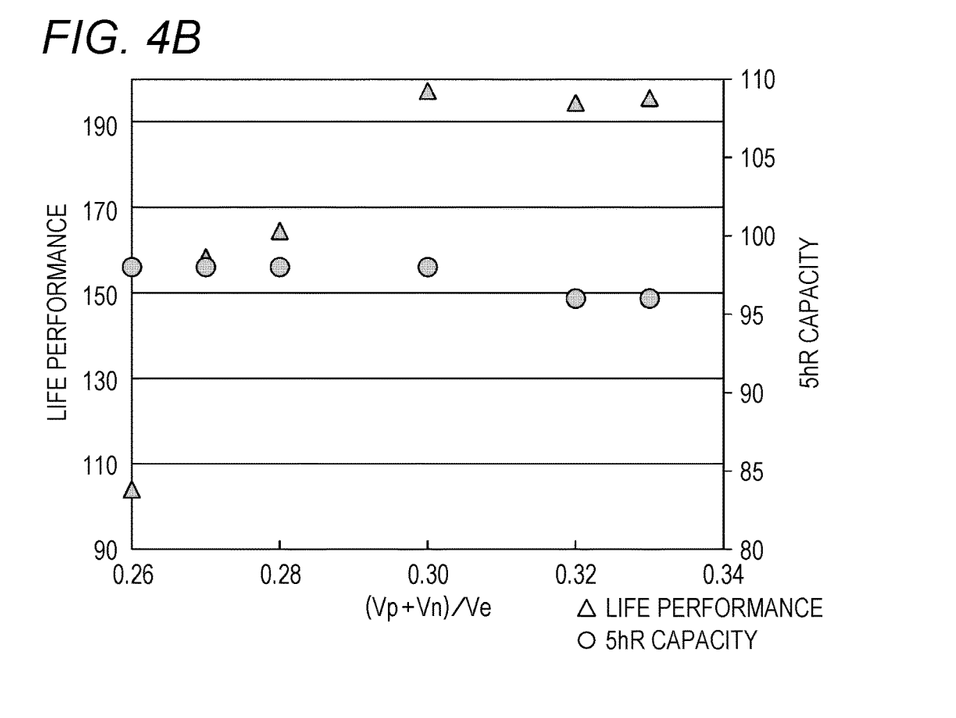
Figure 5A:
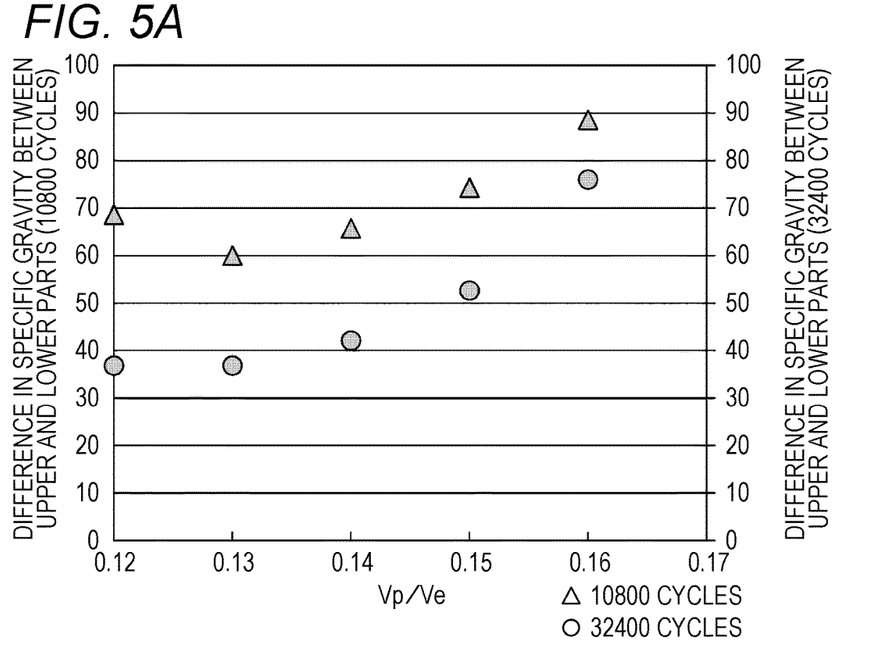
FIGS. 5A and 5B show the relationship among $Vp/Ve$, differences in specific gravity between the upper and lower parts of the electrolyte solution, life performance, and 5-hour rate capacity.
Figure 5B:
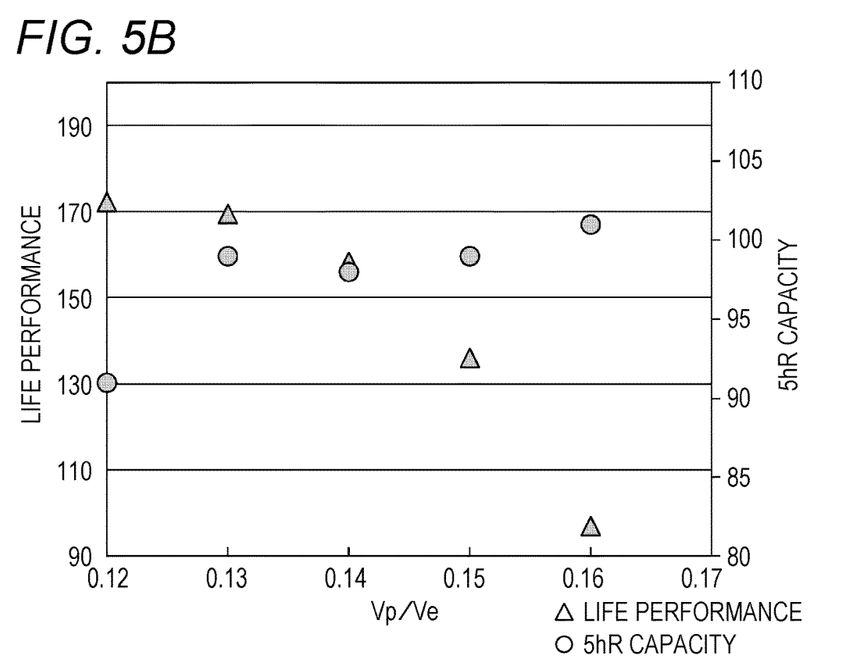
Figure 6A:
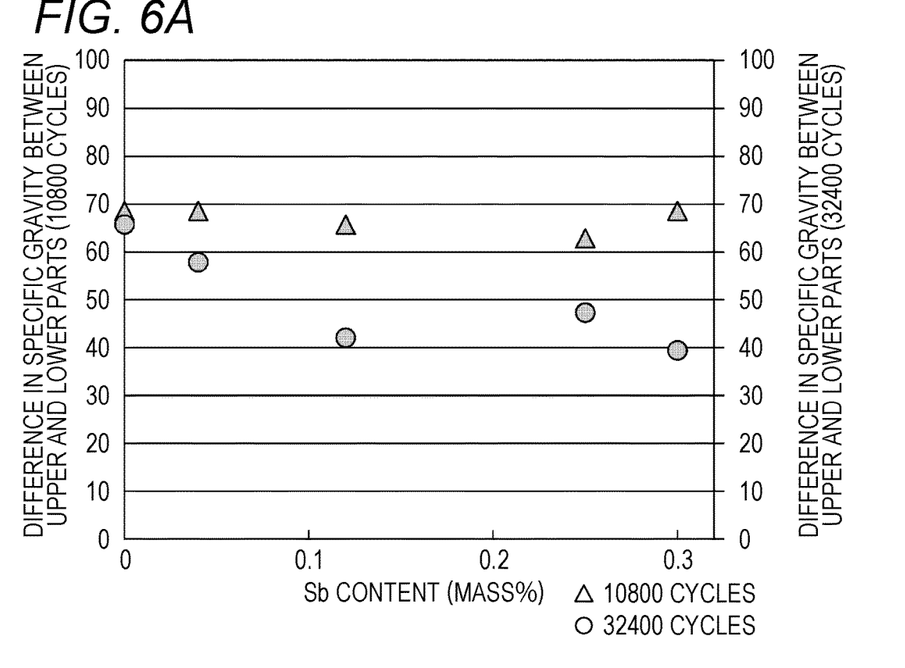
FIGS. 6A and 6B show the relationship among antimony content, differences in specific gravity between the upper and lower parts of the electrolyte solution, life performance, and 5-hour rate capacity.
Figure 6B:
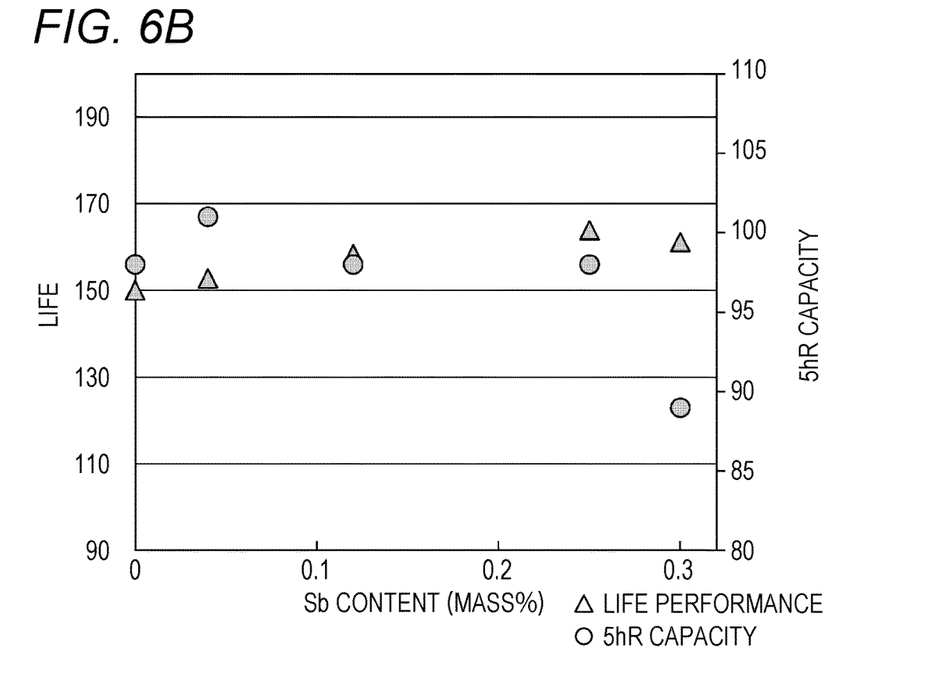

The obtained result is shown in the following Tables 2 and 3 and in graphs of FIGS. 4A to 6B. Note that, the difference in specific gravity between the upper and lower parts in the electrolyte solution, life performance (the number of life cycles) and 5-hour rate capacity in Table 2 are represented by relative values compared against the result of No. A3 battery subjected to test being 100. The difference in specific gravity between the upper and lower parts in the electrolyte solution and life performance (the number of life cycles) in Table 3 are represented by relative values compared against the result of No C1 battery subjected to test being 100. The graphs of FIGS. 4A and 4B are created by plotting data of the batteries subjected to test in which Vp/Ve is 0.14 and the antimony content is 0.12 mass %. The graphs of FIGS. 5A and 5B are created by plotting data of the batteries subjected to test in which (Vp+Vn)/Ve is 0.27 and the antimony content is 0.12 mass %. The graphs of FIGS. 6A and 6B are created by plotting data of the batteries subjected to test in which (Vp+Vn)/Ve is 0.27 and Vp/Ve is 0.14. Note that, as to the batteries subjected to test that reached the battery life before the number of a prescribed cycle is finished, "not achieved" is shown in the column of the difference in specific gravity between the upper and lower parts in the electrolyte solution.

Similar idling stop life test and 5-hour rate capacity test were carried out employing valve regulated lead-acid batteries of type B20 in JIS format as the batteries subjected to test. The result is shown in the following Table 4. Note that, the difference in specific gravity between the upper and lower parts of the electrolyte solution, life performance (the number of life cycles) and 5-hour rate capacity in Table 4 are represented by relative values compared against the result of No. B1 battery subjected to test being 100.

TABLE 2

| No. | (Vp + Vn)/Ve | Vp/Ve | Positive active material Sb content (mass %) | Difference in specific gravity between upper and lower parts of electrolyte solution Relative to A3 | | life performance Relative to A3 | 5hR capacity Relative to A3 |
|---|---|---|---|---|---|---|---|
| | | | | 10800 times | 32400 times | | |
| A1  | 0.25 | 0.16 | 0    | 129 | Not achieved | 56  | 102 |
| A2  | 0.26 |      |      | 117 | Not achieved | 83  | 101 |
| A3  |      | 0.15 |      | 100 | 100 | 100 | 100 |
| A4  |      |      | 0.12 | 91  | 92  | 103 | 100 |
| A5  |      | 0.14 | 0    | 97  | 97  | 101 | 98  |
| A6  |      |      | 0.12 | 94  | 82  | 104 | 98  |
| A7  |      | 0.13 | 0    | 100 | 95  | 103 | 97  |
| A8  |      |      | 0.12 | 97  | 76  | 106 | 96  |
| A9  |      | 0.12 | 0    | 114 | 108 | 100 | 93  |
| A10 | 0.27 | 0.16 |      | 91  | Not achieved | 92  | 103 |
| A11 |      |      | 0.12 | 89  | 76  | 97  | 101 |
| A12 |      | 0.15 | 0    | 74  | 66  | 128 | 101 |
| A13 |      |      | 0.04 | 71  | 58  | 131 | 102 |
| A14 |      |      | 0.12 | 74  | 53  | 136 | 99  |
| A15 |      |      | 0.25 | 69  | 39  | 142 | 96  |
| A16 |      |      | 0.30 | 71  | 45  | 139 | 91  |
| A17 |      | 0.14 | 0    | 69  | 66  | 150 | 98  |
| A18 |      |      | 0.04 | 69  | 58  | 153 | 101 |
| A19 |      |      | 0.12 | 66  | 42  | 158 | 98  |
| A20 |      |      | 0.25 | 63  | 47  | 164 | 98  |
| A21 |      |      | 0.30 | 69  | 39  | 161 | 89  |
| A22 |      | 0.13 | 0    | 63  | 58  | 161 | 96  |
| A23 |      |      | 0.04 | 66  | 53  | 164 | 98  |
| A24 |      |      | 0.12 | 60  | 37  | 169 | 99  |
| A25 |      |      | 0.25 | 63  | 45  | 175 | 96  |
| A26 |      |      | 0.30 | 57  | 39  | 172 | 93  |
| A27 |      | 0.12 | 0    | 66  | 63  | 164 | 92  |
| A28 |      |      | 0.12 | 69  | 37  | 172 | 91  |
| A29 | 0.28 | 0.16 | 0    | 77  | 79  | 111 | 102 |
| A30 |      | 0.15 | 0    | 63  | 63  | 139 | 99  |
| A31 |      |      | 0.12 | 69  | 42  | 147 | 98  |
| A32 |      | 0.14 | 0    | 60  | 58  | 156 | 97  |
| A33 |      |      | 0.12 | 60  | 37  | 164 | 98  |
| A34 |      | 0.13 | 0    | 60  | 58  | 172 | 96  |
| A35 |      |      | 0.12 | 63  | 34  | 183 | 96  |
| A36 |      | 0.12 | 0    | 54  | 61  | 167 | 90  |
| A37 |      |      | 0.12 | 49  | 39  | 175 | 88  |
| A38 | 0.30 | 0.14 | 0    | 40  | 34  | 189 | 97  |
| A39 |      |      | 0.12 | 46  | 26  | 197 | 98  |
| A40 | 0.32 |      | 0    | 46  | 39  | 183 | 96  |
| A41 |      |      | 0.12 | 51  | 29  | 194 | 96  |
| A42 | 0.33 | 0.15 | 0    | 54  | 39  | 183 | 97  |
| A43 |      |      | 0.12 | 51  | 34  | 192 | 98  |
| A44 |      | 0.14 | 0    | 51  | 42  | 184 | 96  |
| A45 |      |      | 0.12 | 51  | 32  | 196 | 96  |
| A46 |      | 0.13 | 0    | 49  | 42  | 186 | 95  |
| A47 |      |      | 0.12 | 57  | 32  | 197 | 93  |

TABLE 3

| No. | (Vp + Vn)/Ve | Vp/Ve | Positive active material Sb content (mass %) | Total pore volume (cm³/g) | Negative electrode plate Pore size: 0.5 μm to 5 μm | Positive electrode plate Proportion to total pore volume (%) Pore size: 0.1 μm to 1 μm | Pore size: 1 μm or greater | Difference in specific gravity between upper and lower parts of electrolyte solution Relative to C1 10800 times | 32400 times | Life performance Relative to C1 |
|---|---|---|---|---|---|---|---|---|---|---|
| C1  | 0.28 | 0.15 | 0    | 0.11 | 43 | 33 | 31 | 100 | 100 | 100 |
| C2  |      |      |      |      | 62 | 31 | 32 | 105 | 100 | 102 |
| C3  |      |      |      | 0.12 | 39 | 35 | 32 | 95  | 95  | 101 |
| C4  |      |      |      |      | 63 | 36 | 31 | 71  | 65  | 108 |
| C5  |      |      |      | 0.14 | 41 | 31 | 34 | 86  | 85  | 103 |
| C6  |      |      |      |      | 65 | 31 | 33 | 62  | 60  | 111 |
| C7  |      |      |      | 0.15 | 42 | 32 | 33 | 95  | 90  | 103 |
| C8  |      |      |      |      | 61 | 30 | 32 | 76  | 65  | 107 |
| C9  |      |      | 0.12 |      | 60 | 32 | 30 | 73  | 57  | 116 |
| C10 |      |      | 0    | 0.16 | 63 | 33 | 34 | 90  | 85  | 102 |
| D1  |      |      |      | 0.14 | 40 | 54 | 31 | 81  | 100 | 102 |
| D2  |      |      |      |      | 41 | 40 | 19 | 86  | 85  | 104 |
| D3  |      |      |      |      | 38 | 56 | 19 | 57  | 50  | 113 |
| D4  |      |      | 0.12 |      | 40 | 55 | 17 | 60  | 44  | 119 |

TABLE 4

| No. | (Vp + Vn)/Ve | Vp/Ve | Positive active material Sb content (mass %) | Difference in specific gravity between upper and lower parts of Electrolyte solution Relative to B1 10800 times | 32400 times | Life performance Relative to B1 | 5hR capacity Relative to B1 |
|---|---|---|---|---|---|---|---|
| B1 | 0.26 | 0.15 | 0    | 100 | Not achieved | 100 | 100 |
| B2 | 0.27 |      |      | 83  |              | 102 | 100 |
| B3 |      |      | 0.12 | 82  |              | 108 | 98  |
| B4 | 0.32 |      | 0    | 82  |              | 98  | 99  |

As to the pore volume of the whole positive and negative active materials, as the sum volume Vp+Vn of the total pore volume Vp of the positive active material and the total pore volume Vn of the negative active material contained in the electrode group is greater, the difference in specific gravity between the upper and lower parts of the electrolyte solution is reduced. Among others, when (Vp+Vn)/Ve, i.e., the ratio of Vp+Vn to the volume Ve of the electrode group, is 0.27 or greater, the stratification suppression effect is great and the excellent life performance is exhibited. However, when (Vp+Vn)/Ve exceeds 0.32, the stratification suppression effect is saturated.

As to the pore volume of the positive active material, in the case where the density of the active material is varied while the quantity (mass) of the active material is maintained to be constant, the difference in specific gravity tends to become small as the total pore volume Vp of the positive active material contained in the electrode group is smaller. However, when it is excessively small, a sufficient capacity cannot be obtained. Then, in view of the balance between the stratification suppression effect and the capacity, it is found that appropriate range of the ratio of the total pore volume Vp of the positive active material to the volume Ve of the electrode group, i.e., Vp/Ve, is 0.13 to 0.15.

As to the antimony content in the positive active material, when it is 0.04 mass % or greater, stratification can be fully suppressed even at the terminal stage of the battery life. However, when the antimony content in the positive active material exceeds 0.25 mass %, formability is reduced and the satisfactory capacity cannot be easily obtained.

As shown in Table 3, a further reduction in the difference in specific gravity between the upper and lower parts of the electrolyte solution, and the life performance is improved with Nos. C4, C6, C8 and C9 batteries subjected to test having the pore structure in which, in connection with the negative active material, the total pore volume (per unit mass) is 0.12 cm³/g to 0.15 cm³/g and the proportion of the pore volume of the pore size of 0.5 μm to 5.0 μm to the total pore volume is 50% or greater. Similarly, a further reduction in the difference in specific gravity between the upper and lower parts of the electrolyte solution, and the life performance is improved with Nos. D3 and D4 batteries subjected to test having the pore structure in which, in connection with the positive active material, the proportion of the pore volume of the pore size of 0.1 μm to 1.0 μm to the total pore volume is 45% or greater, and the proportion of the pore volume of the pore size of 1 μm or greater to the total pore volume is 25% or smaller.

On the other hand, as shown in Table 4, with the valve regulated lead-acid batteries, as compared to liquid lead-acid batteries, the high stratification suppressing effect cannot be obtained. Then, because of insufficient charging of the positive electrode plate, the batteries have reached their lives at an early stage. Accordingly, it is found that, in the case where a valve regulated lead-acid battery is used in the idling stop system, even when the pore structure is adjusted similarly to the liquid lead-acid batteries, the effect of increasing the life by suppressing stratification may not be expected.

What is claimed is:

1. A liquid lead-acid battery comprising:
an electrode group comprising a lamination of a positive electrode plate in which a positive active material is carried by a positive current collector and a negative electrode plate in which a negative active material is carried by a negative current collector;
an electrolyte solution which has flowability and in which the electrode group is immersed; and
a container storing the electrode group and the electrolyte solution,
wherein when a volume Ve of the electrode group is calculated by $Ve=(Sp+Sn)\times D/2$ where Sp represents an electrode plate area of the positive electrode plate, Sn represents an electrode plate area of the negative electrode plate, and D represents internal dimension of the container in a direction in which the electrode plates of the electrode group are laminated, a ratio $(Vp+Vn)/Ve$ is 0.27 to 0.32, where $Vp+Vn$ is a sum volume of a total pore volume Vp of the positive active material and a total pore volume Vn of the negative active material contained in the electrode group, and Ve is a volume of the electrode group, and
a ratio $Vp/Ve$ is 0.13 to 0.15, where Vp is the total pore volume of the positive active material and Ve is the volume of the electrode group.

2. The liquid lead-acid battery according to claim 1, wherein in the positive active material, a proportion of a pore volume of a pore size of 0.1 μm to 1.0 μm to the total pore volume is 45% or greater, and a proportion of a pore volume of a pore size of 1 μm or greater to the total pore volume is 25% or smaller.

3. The liquid lead-acid battery according to claim 1, wherein in the negative active material, the total pore volume (per unit mass) is 0.12 $cm^3/g$ to 0.15 $cm^3/g$, and a proportion of a pore volume of a pore size of 0.5 μm to 5.0 μm to the total pore volume is 50% or greater.

4. The liquid lead-acid battery according to claim 1, wherein the positive or the negative current collector is a punched current collector.

5. The liquid lead-acid battery according to claim 1, wherein the ratio $(Vp+Vn)/Ve$ is 0.29 to 0.31.

6. The liquid lead-acid battery according to claim 1, wherein Vn is larger than Vp.

7. The liquid lead-acid battery according to claim 1, wherein the liquid lead-acid battery is for use with an idling stop vehicle.

8. An idling stop vehicle using the liquid lead-acid battery according to claim 1.

9. The liquid lead-acid battery according to claim 2, wherein the positive or the negative current collector is a punched current collector.

10. The liquid lead-acid battery according to claim 2, wherein the ratio $(Vp+Vn)/Ve$ is 0.29 to 0.31.

11. The liquid lead-acid battery according to claim 1, wherein Vn is larger than Vp.

12. The liquid lead-acid battery according to claim 1, wherein the liquid lead-acid battery is for use with an idling stop vehicle.

13. An idling stop vehicle using the liquid lead-acid battery according to claim 2.

14. The liquid lead-acid battery according to claim 1, wherein the electrode group further comprises a separator.

* * * * *